May 23, 1939.   H. GOETZE   2,159,355
GASKET AND BINDING THEREFOR
Filed Nov. 6, 1937   3 Sheets-Sheet 1
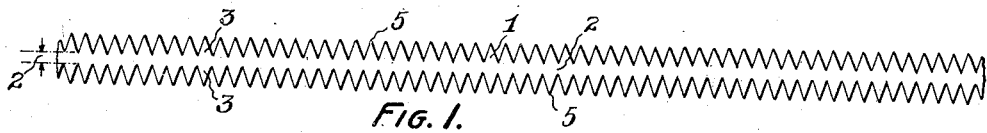
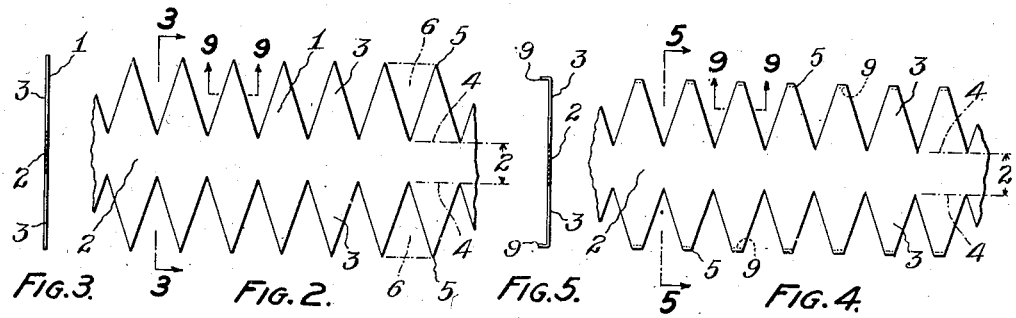
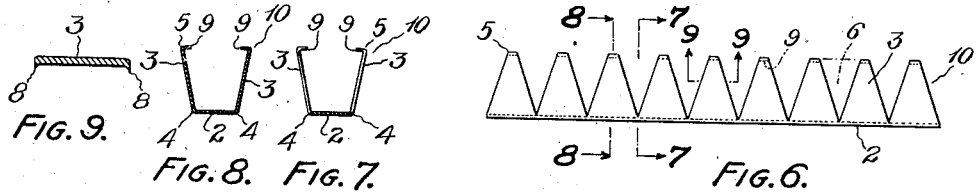
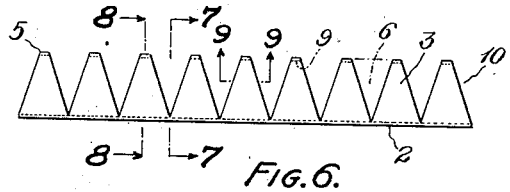
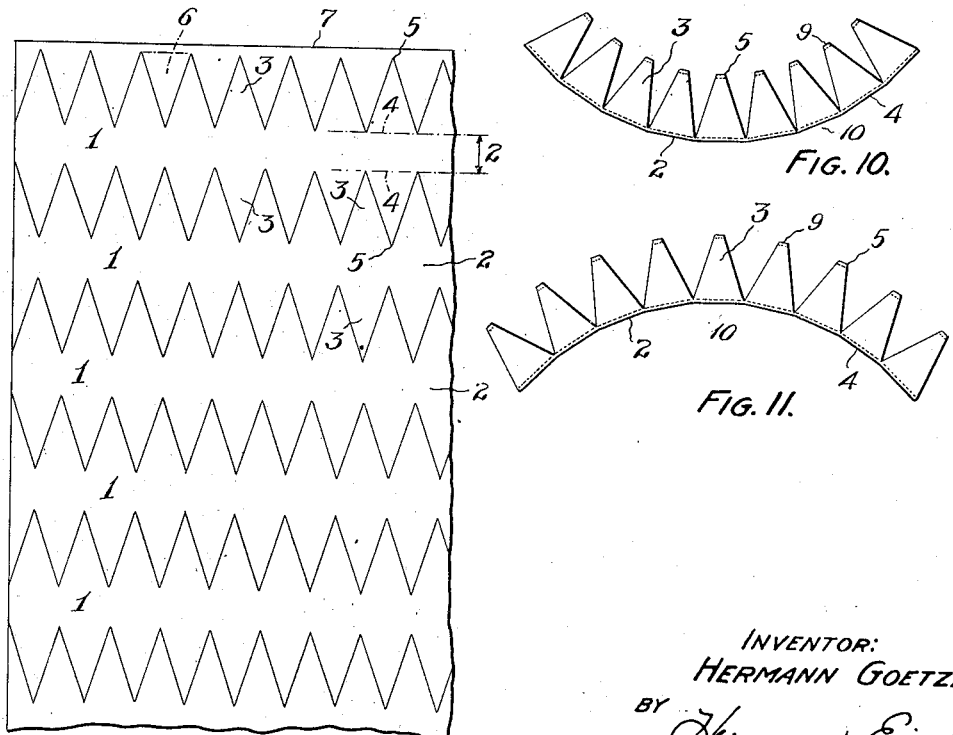
INVENTOR:
HERMANN GOETZE
BY Herman Eisele
ATTORNEY

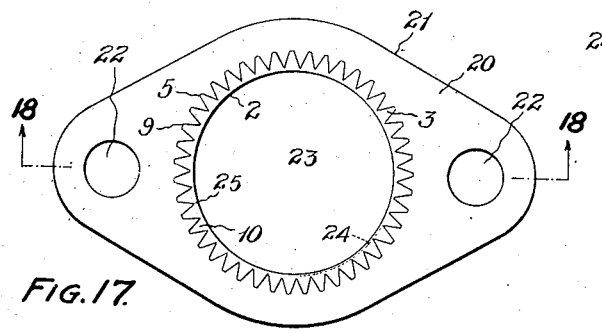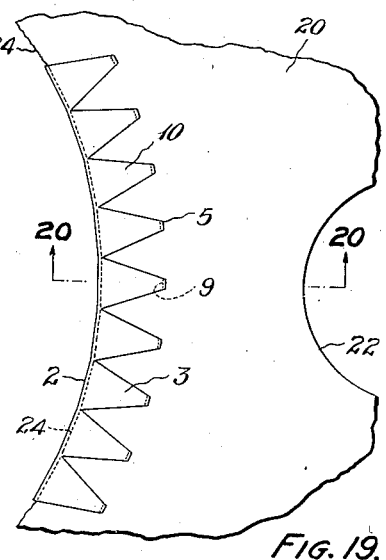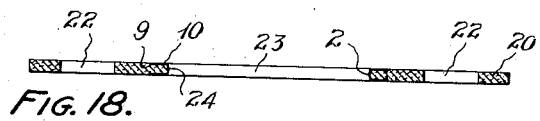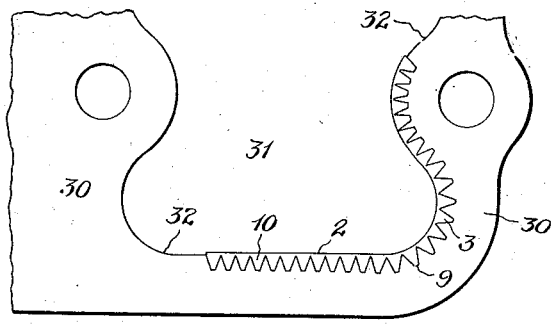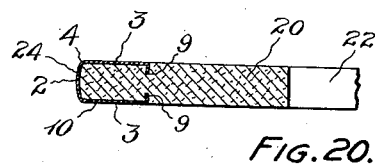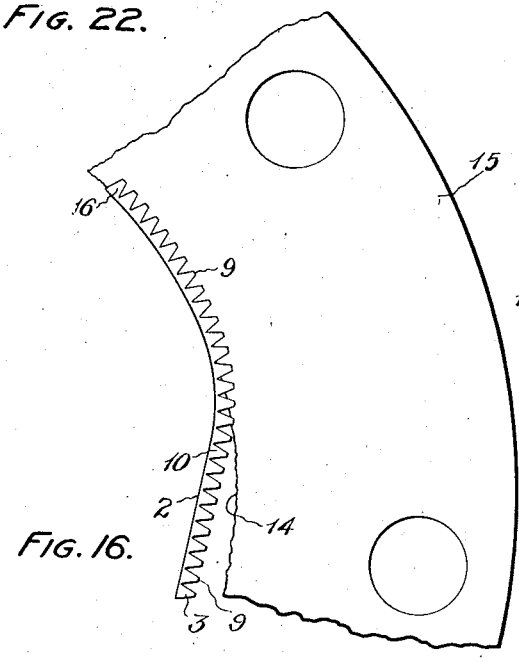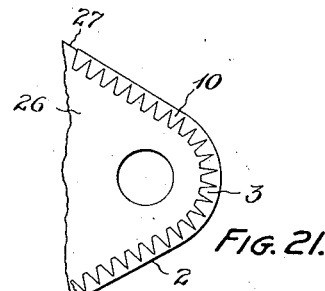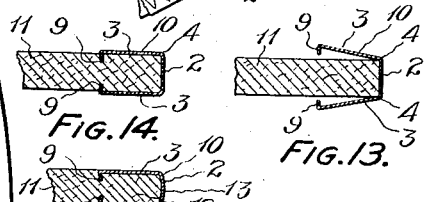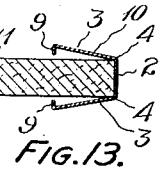

May 23, 1939.　　　　　H. GOETZE　　　　　2,159,355
GASKET AND BINDING THEREFOR
Filed Nov. 6, 1937　　　　3 Sheets-Sheet 3

INVENTOR:
HERMANN GOETZE
BY Herman Eisele
ATTORNEY

Patented May 23, 1939

2,159,355

UNITED STATES PATENT OFFICE 2,159,355

GASKET AND BINDING THEREFOR

Hermann Goetze, Burscheid, near Cologne, Germany, assignor to Frederick W. Goetze, New Brunswick, N. J.

Application November 6, 1937, Serial No. 173,238
In Germany November 30, 1936

4 Claims. (Cl. 288—1)

This relates to bindings or protecting armoring for the edges of gaskets and the like, and to improved gaskets produced by the use of these improved bindings. Such bindings are provided to reinforce and protect the edges of the relatively soft gasket material, and gaskets provided with such bindings are protected to a substantial degree against attack by fluids and heat, and resist the entrance of fluids into the edges of the gasket, and such gaskets also resist distortion and damage in handling and assembly.

Beaded or smooth metal bindings or grommets are well known in the art and have been long used for enclosing both the inner and outer borders of gaskets. These previously used edge bindings or grommets have generally been pre-formed, angle or channel shaped members of the same conformation as the edge of the gaskets to which the grommet or binding has been applied. These grommets have heretofore been applied to the gaskets by heavy presses and have, almost without exception, required special tools conforming to the configurations of the edges of the gasket. These previously known bindings and the tools for applying the same have been made especially for each size or shape of gasket or aperture and involved considerable expense and were therefore not commercially feasible when only smaller quantities of gaskets were required.

Gaskets provided with such grommets have numerous other disadvantages such as a lack of flexibility and resilience; and further, grommets of the above type have usually been forced of sheets in the form of endless rings or the like and as a consequence, considerable waste resulted. Due to the fact that usually no effective gripping relation has been provided between the clamping flanges of the grommet and the gasket material, the gasket material has frequently been squeezed out of the grommet or otherwise displaced when pressure was applied.

It is therefor the purpose of this invention to produce a binding having the advantages inherent in previously known bindings but which does not have any of the disadvantages pointed out above and which has certain definite additional advantages.

It is accordingly one of the objects of this invention to produce a binding material for reinforcing and protecting the edges of gaskets or the like, which does not require to be pre-formed to any special shape or peripheral length.

A further object of this invention is to produce a binding which can be conformed to a convexly curved edge or to a concavely curved edge or to a straight edge with equal facility and which can readily be applied to peripheries of any outline or conformation and which is adapted to armor either the inner or outer edge of the gasket.

A further object of this invention is to provide a binding which is economically adapted to bind and armor irregular shaped gaskets and hand cut gaskets which have heretofore not been reinforced because of the difficulty and expense.

It is a further object of this invention to produce a binding of this type which can readily be applied to the gasket edge without the use of special tools or skill.

It is a further object of this invention to produce a channel shaped binding which is flexible and which will produce a smooth outline when applied to the edge of a gasket.

A further object of this invention is to produce a binding formed with means for effectively securing the binding to the gasket against slipping or displacement with relation to the gasket material.

A further object of this invention is to produce a binding which can be sold in standard lengths to millwrights, steam fitters, plumbers, and the like, which can readily be applied to sheet gaskets of any shape or any type of material on the job.

It is a further object of this invention to produce an improved gasket provided with a binding which will protect the periphery of the aperture of the gasket for at least the full thickness of the gasket and which will not interfere with the natural resilience and cushioning properties of the gasket at the edge to which it is applied.

A further object of this invention is to develop an efficient method of producing my improved binding with a minimum of waste of material.

Further and more specific objects of this invention will become apparent from the following description and claims.

Referring to the drawings:

Fig. 1 is a plan view showing the blank from which this improved binding is formed, including a continuous central band and serrated edge portions.

Fig. 2 is an enlarged view of a small portion of the blank shown in Fig. 1.

Fig. 3 is a transverse sectional view taken on the plane indicated by line 3, 3 in Fig. 2.

Fig. 4 is a view similar to Fig. 2 but showing the apexes of the serrations bent downwardly, this being the next successive operation on the binding strip.

Fig. 5 is a sectional view taken on the plane indicated by line 5, 5 in Fig. 4.

Fig. 6 is another view of the blank shown in Figures 2 and 4 after the binding has been formed into a substantially channel shape by bending the serrated edge portions toward each other about the edge of the band.

Fig. 7 is a sectional view taken on the plane indicated by the line 7, 7 in Fig. 6, this view being taken between serrations.

Fig. 8 is a transverse sectional view taken on the plane indicated by line 8, 8 in Fig. 6, this view being taken through the serrations.

Fig. 9 is an enlarged section through one of the serrations taken on the plane indicated by line 9, 9, in Figures 2, 4, and 8.

Fig. 10 is a plan view showing the channel binding of Fig. 6 bent concavely toward the serrated flanges.

Fig. 11 is a similar plan view showing the channel binding of Fig. 6 flexed convexly with reference to the serrated flanges.

Fig. 12 is a view drawn to the same enlarged scale as Fig. 2, showing the method used in cutting the blank from a sheet.

Fig. 13 is a transverse view showing the first step in applying the binding shown in Figures 6 to 11 to gasket material, this view showing the channel shaped binding in position encompassing the edge of the gasket material before any pressure has been applied.

Fig. 14 is a view similar to Fig. 13 but showing the channel binding affixed to the gasket with sufficient pressure to imbed the downwardly bent apexes of the serrations in the gasket material.

Fig. 15 is a view similar to Fig. 14 showing the relation of the binding to the gasket when a greater pressure is applied to the binding than that used in producing the construction illustrated in Fig. 14.

Fig. 16 is a plan view of a segmental portion of a gasket showing my improved binding partly applied to the inner periphery thereof.

Fig. 17 is a plan view of a gasket formed with an aperture provided with my improved form of serrated binding.

Fig. 18 is a section through the gasket illustrated in Fig. 17, this section being taken on the plane indicated by line 18, 18 in Fig. 17.

Fig. 19 is an enlarged plan view of a portion of Fig. 17.

Fig. 20 is a section taken on line 20, 20 in Fig. 19.

Fig. 21 is a fragmentary view of a gasket similar to a portion of the gasket shown in Fig. 17 to the outer border of which my improved binding has been applied.

Fig. 22 is a fragmentary plan view of a modified type of gasket formed with an aperture defined by an edge of irregular conformation including both concave and convex configurations, this edge being provided with my improved binding.

Figure 23:
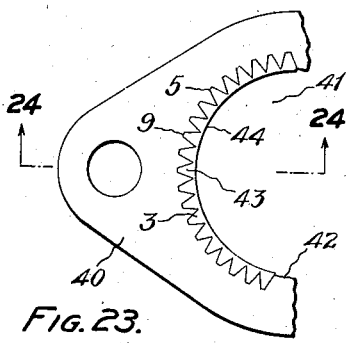
Fig. 23 is a fragmentary plan view of a gasket similar to that shown in Fig. 17, this gasket however being considerably thicker than that shown in Fig. 17.

This improved serrated gasket binding will be described by reference to Figures 1 to 12 which disclose the details of the binding and its manner of production.

The blank 1 from which this binding is produced is illustrated in Fig. 1 and fragmentarily to an enlarged scale in Figures 2 and 3. This blank consists, in the embodiment illustrated, of a continuous band of relatively thin sheet metal indicated at 2 and a plurality of triangular shaped serrations 3 integrally formed with the sheet metal of the band and extending laterally from each side of the band. The bases 4 of these triangular serrations are co-incident with the edges of the continuous band 2 and the apexes or points 5 of the serrations 3 are spaced from the band and from each other. In this preferred construction, no space is allowed between the vertices at the bases of adjacent triangular serrations, as a result of which triangular space 6 is formed between adjacent serrations which is substantially identical in size and shape with the serrations.

These blanks 1 may be made in any desired lengths. The length is dependent principally on the length of binding which can most conveniently be handled by the mechanic.

The blanks are preferably produced by punching from a flat sheet as shown for instance at 7 in Fig. 12, in which is clearly illustrated the location of successive adjacent cuts arranged to produce a minimum of waste. As will appear, the entire sheet is utilized to produce blanks except a negligible amount produced at opposite edges of the stock on making the first and final cuts from the sheet.

The dies for punching of the blanks 1 are preferably so sized that minute but very definite burrs or fins 8 are formed at the edges of the serrations 3, as clearly shown in Fig. 9, for a purpose to be pointed out.

After the punching of the blank 1, the next step in the production of the binding consists in bending small portions of the apexes or points 5 of the serrations substantially at right angles to form minute prongs or teeth 9 as illustrated in Figures 4 and 5. It will be noted that these teeth are formed on the same face of the serrations as the fins 8.

These teeth are preferably bent an angular amount of slightly more than 90 degrees for reasons to be pointed out hereinafter.

The next and final step in the production of this improved binding strip consists of bending the serrations 3 about the edges of the continuous band 2, that is about the base lines 4 of the serrations, as shown in Figures 6, 7, and 8, thus producing in effect a channel shaped member or strip binding indicated generally at 10 of which the continuous band 2 of sheet metal forms the web and the serrations 3 form interrupted flange members. It will be understood that the serrations are bent toward each other so that the teeth 9 and fins 8 face each other. It will also be apparent that the serrations are bent an amount substantially but somewhat less than 90 degrees for reasons to be explained.

The width of the continuous band 2 is preferably made approximately equal to the thickness of the gasket or packing material to which the binding is to be applied.

Figures 13 to 16 show the steps employed in affixing the binding strip to the gasket material.

Figure 13 shows the channel shaped strip binding 10 in position on the gasket 11 prior to the application of pressure. The teeth 9 are substantially perpendicular to the face of the gasket, that is they are substantially parallel to the plane of the web 3 to assure easy entry of the points into the gasket material. This necessitates an angle of slightly less than 90 degrees between the plane of the teeth 9 and the plane of the serrations 3. The distance between opposed teeth 9 is equal to or slightly greater than the thickness of the gasket, that is substantially equal to the width of the band 2. The apexes of the serrations 3 should be above the surface of the gasket a distance not less than the length of the teeth and for this reason the serrations 3 should be bent an amount less than 90 degrees from the plane of the continuous web 2.

The position of the binding on the gasket material after sufficient pressure has been applied to imbed the prongs 9 in the gasket material 11 is clearly shown in Fig. 14 where the prongs 9 are shown anchoring the binding to the gasket material but the serrations are not permanently imbedded in the gasket.

If additional pressure is applied to the binding, the construction shown in Fig. 15 results where the serrations have become imbedded in the gasket material so that their outer faces are substantially flush with the faces of the gasket, and where the gasket material has been compressed adjacent the edge between the serrations, as shown at 12 and where the web 2 is also shown bowed slightly outwardly away from the serrations as shown at 13. This result is produced either by the use of heavy pressure in the process of applying the binding, or in use by pressure of the flanges at the joint. It will be noted that the imbedded prongs 3 are slightly deflected toward the web 2 thus effectively clinch-clamping the binding to the gasket material.

The ease with which this binding is attached to the edges will be clearly understood by reference to Fig. 16 in connection with Figures 13, 14 and 15. Fig. 16 illustrates the procedure followed in applying the binding 10 to the gasket edge by hand, and shows a portion of the strip mounted on the edge 14 of the gasket 15 and the balance of the strip in the process of being applied to the gasket. One end 16 of the serrated binding strip is easily slipped over the edge of the gasket until the web 2 engages the edge 14, the serrations 3 passing above and below the gasket. This starting end 16 of the binding is then temporarily fixed to the gasket by pressure with the fingers or otherwise after which successive portions of the binding 10 are slipped over and simultaneously flexed to conform with the edge of the gasket and temporarily fixed until the entire edge of the gasket is covered. The binding is then permanently fixed to the gasket by tapping the binding progressively with a hammer or other suitable tool or by applying pressure of the desired intensity to the binding either progressively or upon the entire binding simultaneously.

It will be evident that the binding attached to the edge of a gasket as described, will be securely fixed to the gasket and cannot readily be detached therefrom. This is due not only to the holding power of the prongs or teeth 9 which are in effect clinched clamped in the gasket material but is also due to the gripping action of the fins 8 at the sides of the serrations which, being relatively sharp, readily imbed themselves in the surface of the gasket material and effectively prevent lateral displacement of the serrations on the gasket. It will also be clear that the bond between the serrated binding and the gasket will become more effective with an increase of pressure, as for instance, between flanges.

The material used for this improved binding is preferably relatively thin pliable metal such for instance as tin or copper, which is readily deformed under such pressures as are usually applied to gaskets. As will be understood, the thin sheet metal web portion 2 is relatively flexible in a direction at right angles to the plane of the web, and it will be evident from an inspection of Figures 10 and 11, that this channel shaped strip binding is readily flexed either concavely or convexly with relation to the serrations. It will also be evident that this channel shaped binding is not readily flexed in a direction parallel to the plane of the web 2.

As is well known, the edge of gaskets and especially of hand cut gaskets, is usually rough and irregular due to the fibrous or composite nature of the gasket material. When this improved binding is applied to these rough edges, a smooth and uniform edge is produced.

It is also to be noted that the teeth 9 formed at the apexes of the serrations need not be very long in practice to effectively clinch-clamp the binding to the gasket material. Teeth which are twenty thousandths of an inch in length have produced very satisfactory results.

This improved channel shaped serrated binding is readily adapted to armor the edges of any type of flat gasket and of any regular or irregular contour. One application of this serrated binding to a common form of gasket is illustrated in Figures 17 to 20, inclusive, in which the gasket 20 is formed with an outer periphery 21, a pair of spaced bolt holes 22 and a central aperture 23 to the periphery 24 of which this improved serrated channel binding 10 has been applied. The starting end of the binding may be applied at any point as for instance at 25 and the binding is progressively applied as described above by reference to Figure 16 until the entire edge of the aperture is covered, the continuous length of serrated binding being cut as soon as the required length has been determined. The ends of the binding are preferably abutted as shown at 25 and this can usually be effected by slightly but immaterially affecting the inside diameter of the binding. The metal of the binding being relatively thin, the ends may be overlapped if necessary without interfering with the effectiveness of the gasket; and in fact, the overlapping of the ends eliminates any break in the applied binding and produces even greater peripheral strength.

This binding is sold in suitable lengths to steam fitters, plumbers, and others for application to gaskets hand cut from sheets by the mechanics on the job, these hand cut gaskets, thus edge bound, having all the advantages of the shop produced gaskets. It is not even necessary to permanently affix the binding to the gasket at all points; it is sufficient for a gasket made on the job if the binding is fitted to the edge and tacked at spaced intervals by finger pressure or otherwise sufficiently to hold the binding in place on the gasket. The binding being relatively soft will be effectively affixed to and imbedded in the gasket when bolt pressure is applied to the flanges.

This serrated binding strip is equally well adapted to protect outer peripheries of gaskets and Fig. 21 illustrates a fragmentary portion of a gasket 26, having an outer periphery 27 to which the serrated channel binding strip 10 has been affixed.

As previously stated, this binding is sufficiently flexible to permit its application to irregular contours and by way of illustration, Fig. 22 illustrates a gasket 30 formed with an aperture 31 whose edge 32 includes successively concave and convex portions to which the binding 10 has been affixed. This binding 10 is sufficiently flexible that it is adapted to satisfactorily bind sharp corners, either interior or exterior.

Figure 25:
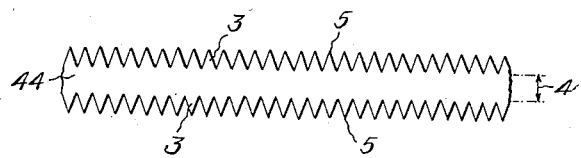
Fig. 25 is a view similar to Fig. 1 but showing the blank used for producing the channel shaped binding applied to the gasket shown in Figures 23 and 24.
Figure 24:
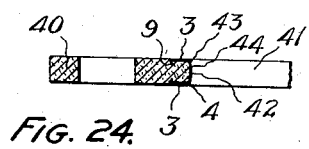
Fig. 24 is a sectional view taken on the plane indicated by line 24, 24 in Fig. 23, showing this increased proportionate thickness of gasket material.

The constructions illustrated thus far have disclosed these serrated edge facings applied to relatively thin packing material. This type of serrated channel binding is equally well adapted for binding the edges of relatively thicker materials and this construction is shown in Figures 23 and 24 where the relatively thick gasket 40 is formed with an aperture 41 defined by an edge 42 which is protected by the serrated binding 43. This binding is similar to the binding 10, being formed with serrations 3 and prongs or teeth 9 at the apexes 5 of the serrations, and differs only from the binding 10 in the band portion. This band or web portion 44 is considerably wider than the web 2 of the binding 10 and is substantially the same width as the thickness of the gasket material. The blank used for making the binding strip 43 is clearly shown in Fig. 25.

Figure 26:
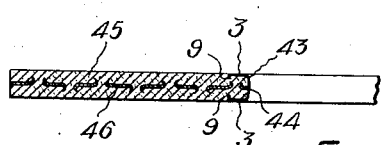
Fig. 26 shows this improved binding applied to a composite gasket consisting of relatively soft packing material reinforced by a metallic insert.

This improved binding is not only applicable to homogeneous gasket materials, but is well adapted to reinforce and smooth the edges of composite or reinforced gasket materials of any usual type, and by way of illustration, a reinforced gasket 45 provided with a metallic reinforcing member 46 is shown in Fig. 26, to the edge of which a serrated binding 43 is applied.

Figure 27:
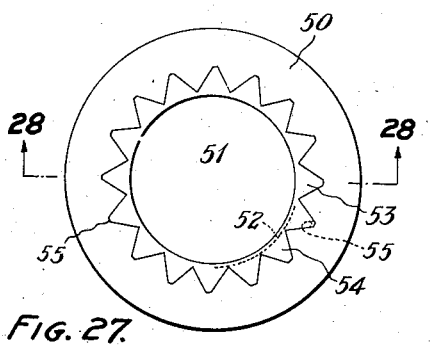
Fig. 27 is a plan view of a gasket provided with another modified form of binding, the modification consisting principally in an alteration in the form of the serrations.
Figure 28:
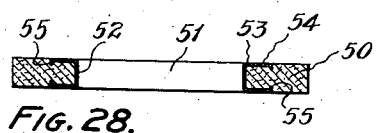
Fig. 28 is a transverse section taken on the plane indicated by line 28, 28 in Fig. 27.

As will also be understood, various other modifications may be made in this serrated binding strip including alterations in the size and form of the serrations. By way of illustration, Figures 27 and 28 illustrate a gasket 50 formed with an aperture 51 defined by an edge 52 to which has been applied a serrated binding 53 formed with serrations 54 which are shown in the drawings to be shorter and stubbier in proportion than the serrations in the bindings hereinbefore described. These serrations 54 are bent over at their apexes to form the prongs 55. These serrations may also be provided with the usual fins at the edges corresponding to the fins 8 in the previously described constructions.

Figure 29:
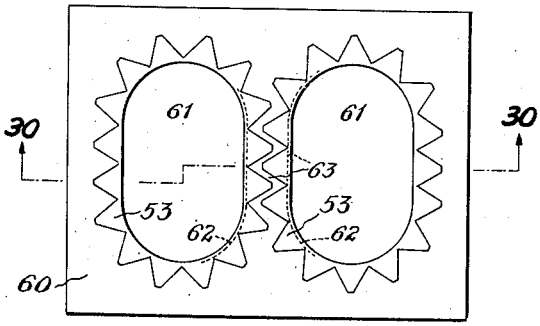
Fig. 29 is a plan view of a gasket formed with a pair of closely adjacent openings reinforced by the same type of binding as that shown in Fig. 27.
Figure 30:
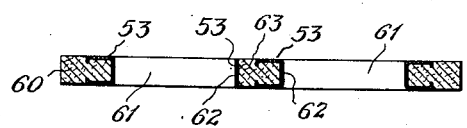
Fig. 30 is a transverse section taken on the plane indicated by line 30, 30 in Fig. 29.

Figures 29 and 30 show another application of the binding 53 to a gasket 60 formed with two spaced apertures 61 defined by peripheral edges 62, the two apertures being spaced apart by a relatively narrow bridge portion 63. As will appear; the binding is applied to the periphery of both apertures and due to the fact that the bridge portion 63 is narrower than the sum of the heights of the serrations, it is necessary to stagger the serrations at the opposite sides of the bridge 63, as shown. The serrations of the two bindings accordingly overlap each other and in this manner constitute a very effective reinforcement for the narrow bridge portion 63.

Figure 31:
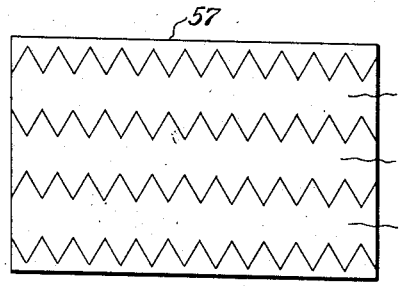
Fig. 31 is a view showing the method of cutting the blanks for the binding disclosed in Figures 27 and 29, from a flat sheet.

Fig. 31 illustrates the method of producing the blanks 56 for the binding 53 by successive cuts along one edge of the sheet of metal 57 whereby the scrap material is reduced to a negligible amount at the opposite edges of the stock.

Various other uses of this binding will be apparent from the characteristics of the binding which have been set forth.

It will be evident that the above described binding is adapted to effectively reinforce, smooth and protect the edges of gaskets, that it does not require to be pre-formed to any special shape or length, that it is readily applied to peripheries of any outline or configuration, that no special tools or skill are required for its application to the gaskets, and that, when applied to gaskets, it is effectively clinch-clamped to the gasket material.

Many other modifications of this invention and its application, in addition to those shown, will naturally occur to those skilled in this art, and the present disclosures should therefore be considered as typical only and applicant desires not to be limited to the exact construction shown and described.

What I claim is:

1. A substantially channel shaped binding strip for gaskets or the like adapted to be progressively conformed to and progressively affixed to the margin of the gasket or the like comprising a length of relatively pliable thin sheet metal having a band-like web portion with parallel side edges and having channel flanges comprising a plurality of substantially triangular shaped serrations having base lines coincident with said edges and integrally formed therewith and bent laterally therefrom, whereby the binding is adapted to be smoothly bent around curves of short radius.

2. A substantially channel shaped binding strip for gaskets or the like adapted to be progressively conformed to and progressively affixed to the margin of the gasket or the like comprising a length of relatively pliable thin sheet metal having a band-like web portion with parallel side edges, and having channel flanges comprising a plurality of substantially triangular shaped serrations having base lines coincident with said edges and integrally formed therewith and bent laterally therefrom, whereby the binding is adapted to be smoothly bent around curves of short radius, and portions of the free edges of the serrations being directed inwardly of the channel to form miniature projections from the flanges adapted to be embedded in the gasket or the like to hold the binding strip thereto.

3. A substantially channel shaped binding strip for gaskets or the like adapted to be progressively conformed to and progressively affixed to the margin of the gasket or the like comprising a length of relatively pliable thin sheet metal having a band-like web portion with parallel side edges, and having channel flanges comprising a plurality of substantially triangular shaped serrations having base lines coincident with said edges and integrally formed therewith and bent laterally therefrom, whereby the binding is adapted to be smoothly bent around curves of short radius, and the apexes at the free ends of the serrations being bent inwardly to form miniature prongs adapted to be embedded in the gasket or the like to hold the binding strip thereto.

4. A gasket comprising a sheet of packing material formed with an edge having applied thereto a metallic, generally channel shaped binding comprising a length of relatively pliable thin sheet metal having a band-like web portion with parallel side edges and having channel flanges comprising a plurality of substantially triangular shaped serrations having base lines coincident with said edges and integrally formed therewith and bent laterally therefrom, and the apexes at the free ends of the serrations being bent inwardly to form miniature prongs embedded in said sheet of packing material at the margins of its edge for holding the binding strip thereto with the web substantially covering the edge of the sheet and the serrated flanges engaging the margins thereof.

HERMANN GOETZE.